Feb. 7, 1939.  W. S. WOLFRAM  2,146,043
AUTOMOBILE CLUTCH
Filed July 16, 1937
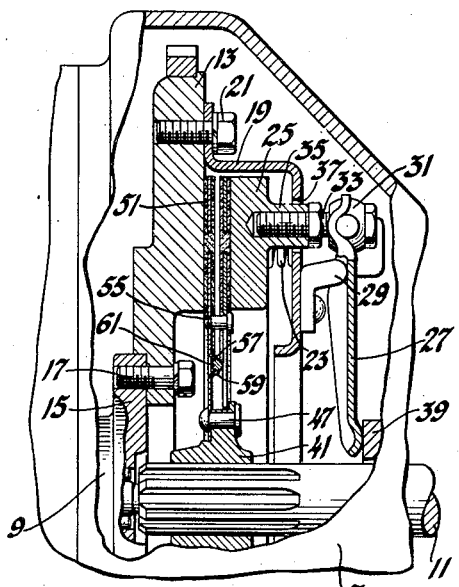
Fig. 1
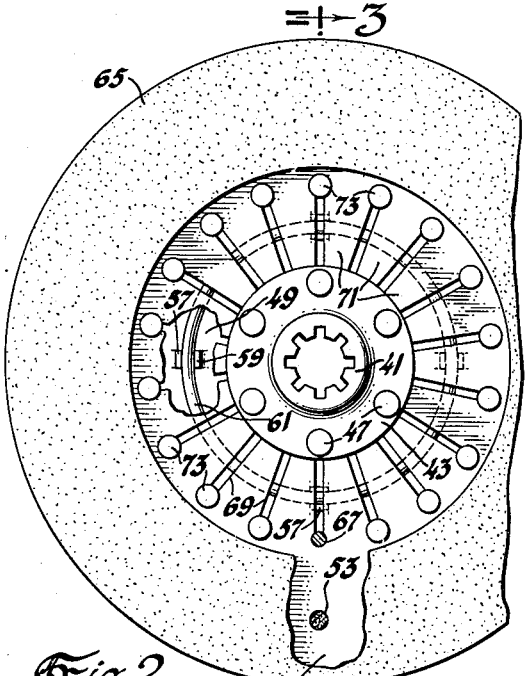
Fig. 2
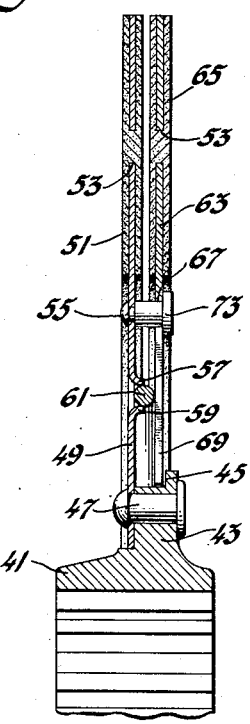
Fig. 3
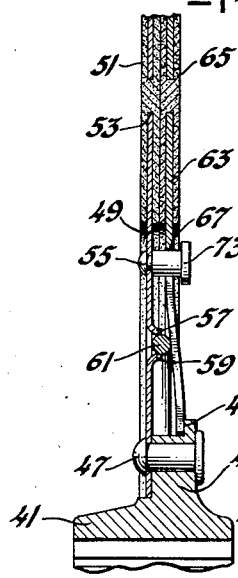
Fig. 4
Inventor
William S. Wolfram
Attorneys Patented Feb. 7, 1939

2,146,043

UNITED STATES PATENT OFFICE 2,146,043

AUTOMOBILE CLUTCH

William S. Wolfram, Dayton, Ohio, assignor to General Motors Corporation, Detroit, Mich., a corporation of Delaware Application July 16, 1937, Serial No. 153,913

5 Claims. (Cl. 192—52)

This invention relates to friction clutches such as are used on motor vehicles to couple the engine and transmission shafts.

An object of the invention is to improve the driven member of such a clutch whereby a gradual engagement may take place.

As another and specific object the invention uses yielding means acting against the conventional springs to spread apart two parallel driven discs constituting the driven member.

As still another object related to the above the inventive idea contemplates a location of the yielding means such that it may be free from the influence of the heat developed in the operation of the clutch.

Other objects and advantages will be understood from the following description.

In the accompanying drawing:

Figure 1 is a view in side elevation of a clutch housing, the housing being broken away and the clutch elements being shown in section.

Figure 2 is a view in elevation of the driven member.

Figure 3 is a section on line 3—3 of Figure 2.

Figure 4 is a similar section with the parts in different relative positions.

Referring to the several figures of the drawing, numeral 7 represents the clutch housing, 9 the engine shaft, and 11 the clutch output shaft or transmission shaft. At 13 is shown the flywheel secured to flange 15 by fastening means 17. The flywheel has a cover 19 secured thereto as at 21. The cover serves as an abutment for a plurality of springs, one of which is shown and marked 23. These springs push the pressure plate 25 toward the flywheel. To withdraw the pressure plate, levers or fingers 27 rock on cover plate lugs 29 and engage the outer ends 31 of members 33 screw threaded into the pressure plate lugs 35 extending through cover plate openings 37. The levers are rocked by a throwout collar 39 which is to be reciprocated by a throwout lever not shown.

It is the driven member with which the invention is concerned. This member comprises a hub 41 non-rotatably carried by shaft 11. The hub has a flange 43 formed with a shoulder 45. To the hub is secured by rivets 47 a driven plate 49. This plate may be and preferably is of spring steel. The plate 49 extends radially and into the region between the flywheel and the pressure plate. It carries suitable friction facing material 51. The friction facing may be riveted or otherwise secured. In the drawing it is shown as molded to the plate, there being openings 53 in the plate which receive the facing material, thus assisting in locking the latter. A plurality of shoulder rivets 55 are secured in a circular series to the driven plate. A plurality of pairs of struck up lugs 57 and 59 are also formed in a circular series and located radially between the rivets 55 and the hub. These lugs 57 and 59 retain against the face of the driven plate, a circular ring 61 of wire preferably round in cross-section.

Parallel with the driven plate is a second plate 63 also preferably formed from spring steel. This second plate is also provided with friction facing 65. It has a circumferential series of holes 67 embracing the rivets 55 whereby the concentric relation of plates 49 and 63 is maintained but whereby relative axial movement is permitted. Radially inward from the holes 67 are slots 69 forming spring tongues 71 extending to the inner margin of the second plate, these tongues at that point being adjacent the shoulder 45 of the hub.

When the clutch is in its released position as shown by Figure 3, plate 63 is substantially parallel with plate 49 throughout its extent. The heads 73 of the rivets 55 are engaged by the plate 63 around the holes 67. The spring fingers engage the ring 61. When the clutch springs 23 are permitted to push the pressure plate toward the flywheel the facings on the two plates frictionally engage the flywheel and the pressure plate. As the second plate, with its facing, approaches the driven plate, it moves axially on the rivets as will be seen by comparing Figure 3 with Figure 4. Since it is in contact with ring 61 the spring tongues now engage the shoulder 45 and as the axial movement continues they are distorted to the shape shown in Figure 4 as the facings on the two plates come into contact. During the progress of this movement the yielding tongues oppose the action of the clutch engaging springs 23 and insure a smooth and gradual pickup of the load, the rotary motion of the driven members beginning with the frictional engagement between the two facings and the flywheel and pressure plate before the facings actually contact each other.

In many clutches heretofore suggested it has been proposed to make use of yielding means between the pressure plate and flywheel which yielding means resists the action of the main clutch springs. When, however, this yielding means has been placed in the region between the pressure plate and the flywheel face it has been subjected to the heat developed from the frictional engagement of the clutch members and therefore has been subject to damage. In the present design the spring tongues are removed from the relatively hot annular space and are therefore less likely to be injured.

I claim:

1. In a clutch, spaced driving members mounted for relative axial movement toward and from each other, a driven member, said driven member comprising a hub, a driven plate secured thereto and having a portion thereof positioned between said driving members, an abutment ring carried by said driven plate, said ring being positioned radially outward from said hub, a second plate disconnectedly associated with said hub, means to mount said second plate for movement axially relative to said driven plate and normally spaced therefrom by said ring, said second plate also having an outer region between said driving members.

2. In a clutch, spaced driving members mounted for relative axial movement toward and from each other, a driven member, said driven member comprising a hub, a driven plate secured thereto and having a portion thereof positioned between said driving members, an abutment ring carried by said driven plate, a second plate, means to mount said second plate for movement axially relative to said driven plate and normally spaced therefrom by said ring, said second plate also having an outer region between said driving members, said hub having a shoulder and said second plate adapted to engage said shoulder and to be distorted by contact with said ring and shoulder as the driven plate and second plate are moved into contact by the approach of the driving members toward each other.

3. In a clutch, spaced driving members mounted for relative axial movement toward and from each other, a driven member, said driven member comprising a hub, a driven plate secured thereto and having a portion thereof positioned between said driving members, an abutment ring carried by said driven plate, a second plate, means to mount said second plate for movement axially relative to said driven plate and normally spaced therefrom by said ring, said second plate also having an outer region between said driving members, said second plate having slots extending radially from its inner peripheral margin to form spring tongues.

4. In a clutch, driving members including a flywheel and a coaxial slidable pressure plate, a driven member comprising a hub, a driven plate secured thereto and extending radially to a position between said driving members, a second plate substantially parallel to said driven plate, the outer region of said second plate also being positioned between said driving members, means normally spacing said second plate from said driven plate, said last named means comprising a ring carried by said driven plate spaced radially outward from said hub and engaging said second plate, said second plate in the region of said ring being yieldable and other means cooperating with said ring to bend said second plate when the outer portion of said driven plate and second plate are gripped between said flywheel and pressure plate.

5. In a clutch, driving members including a flywheel and a coaxial slidable pressure plate, a driven member comprising a hub, a driven plate secured thereto and extending radially to a position between said driving members, a second plate substantially parallel to said driven plate, the outer region of said second plate also being positioned between said driving members, means normally spacing said second plate from said driven plate, said last named means comprising a ring carried by said driven plate and engaging said second plate, said second plate in the region of said ring being yieldable to permit the outer portion of said driven plate and second plate to be gripped between said flywheel and pressure plate, said hub having a shoulder and said yielding part of said second plate engaging said shoulder when the driven elements are gripped to distort said inner region into a bowed formation.

WILLIAM S. WOLFRAM.